Figure 1:
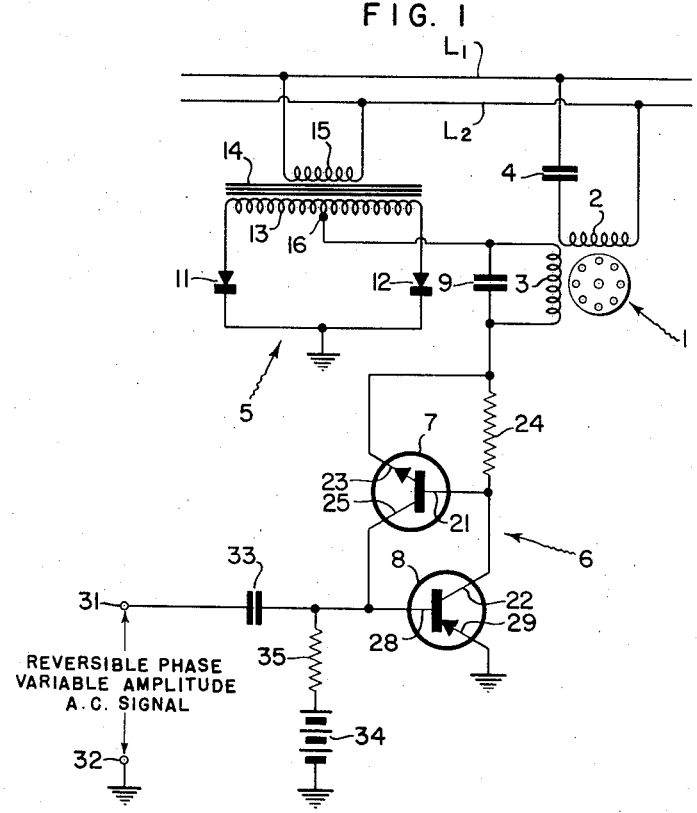

Dec. 16, 1958  K. H. BECK  2,864,985
ELECTRICAL CONTROL APPARATUS
Filed Aug. 30, 1957  2 Sheets-Sheet 1

REVERSIBLE PHASE
VARIABLE AMPLITUDE
A.C. SIGNAL

INVENTOR.
KENNETH H. BECK
BY
ATTORNEY.

Dec. 16, 1958 K. H. BECK 2,864,985
ELECTRICAL CONTROL APPARATUS
Filed Aug. 30, 1957 2 Sheets-Sheet 2

FIG. 2

VOLTAGE ACROSS
COMPLEMENTARY PAIR
(NO CONTROL SIGNAL)

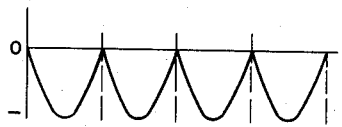

MINIMUM CONTROL SIGNAL

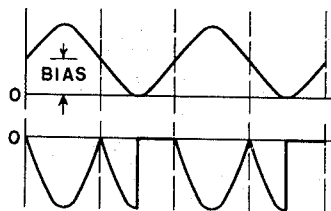

VOLTAGE ACROSS
COMPLEMENTARY PAIR
(MINIMUM CONTROL SIGNAL)

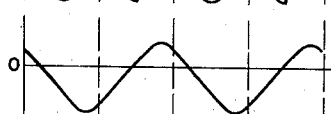

MOTOR CONTROL
WINDING CURRENT
(MINIMUM CONTROL SIGNAL)

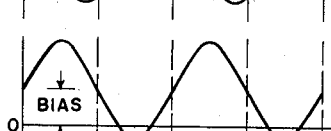

LARGER CONTROL SIGNAL

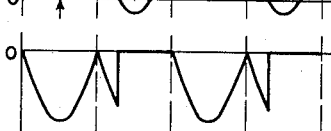

VOLTAGE ACROSS
COMPLEMENTARY PAIR
(LARGER CONTROL SIGNAL)

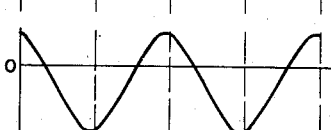

MOTOR CONTROL
WINDING CURRENT
(LARGER CONTROL SIGNAL)

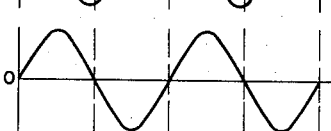

MOTOR POWER
WINDING CURRENT

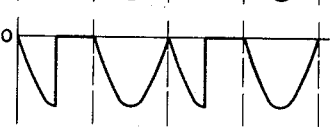

VOLTAGE ACROSS
COMPLEMENTARY PAIR
(MINIMUM CONTROL SIGNAL)
OF OPPOSITE PHASE

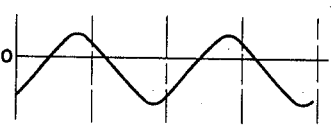

MOTOR CONTROL
WINDING CURRENT
(MINIMUM CONTROL SIGNAL)
OF OPPOSITE PHASE

*INVENTOR.*
KENNETH H. BECK
BY
ATTORNEY.

United States Patent Office 2,864,985
Patented Dec. 16, 1958

2,864,985

ELECTRICAL CONTROL APPARATUS

Kenneth H. Beck, Newtown, Pa., assignor to Minneapolis-Honeywell Regulator Company, Minneapolis, Minn., a corporation of Delaware Application August 30, 1957, Serial No. 681,410

9 Claims. (Cl. 318—207)

This invention pertains to electronic motor control circuits. More specifically, the present invention is concerned with an electronic motor control circuit for a two-phase, reversible, rotating field motor.

In self-balancing measuring and control apparatus of the type disclosed and claimed in the Wills Patent 2,423,540 of July 8, 1947, the measuring circuit unbalance is amplified by means of an electronic amplifier which is operative to impress upon the input of a motor control circuit a signal varying, in amplitude and phase, in accordance with the magnitude and direction of the unbalance. The motor control circuit, in turn, operates in accordance with the phase and amplitude of that signal to selectively energize a motor for rotation in direction and to the extent necessary to rebalance the measuring circuit.

It is a specific object of the present invention to provide a new and improved motor control circuit adapted to control the operation of a reversible rotating field motor in response to a variable amplitude, variable phase, alternating current signal such as is produced in the aforementioned type of self-balancing, measuring and control apparatus.

Another specific object of the present invention is to provide a new and improved motor control circuit employing transistors as its control elements.

Still another object of the present invention is to employ a pair of complementary transistors connected in a bi-stable configuration to control the current flow through the control phase winding of a two-phase reversible rotating field motor.

A further object of the present invention is to provide a new and improved transistor motor drive circuit which utilizes transistors having relatively low power handling capacities so connected that positive feedback provides a bi-stable configuration operative to produce fast switching from a high-voltage low-current state to a low-voltage high-current state.

The various objects of the present invention are achieved in a circuit which employs a pair of transistors, of opposite conductivity types, connected in a bi-stable configuration having an output connected in series with the control winding of a two-phase reversible rotating field motor and a source of pulsating unidirectional current. The input of the bi-stable configuration is adapted to be connected to a source of reversible phase variable amplitude alternating current signals for controlling the switching action of the bi-stable configuration. A source of direct current bias is also connected to the input of the bi-stable configuration to render the configuration non-conductive in the absence of a control signal.

A better understanding of the present invention may be had from the following description read with reference to the accompanying drawings, of which:

Figure 1 is a circuit diagram of a preferred embodiment of the present invention; and Figure 2 is a table showing voltages and currents present in different parts of the circuit shown in Figure 1 under various operating conditions.

Referring now to Figure 1, the numeral 1 designates a two-phase reversible rotating-field motor having a power phase winding 2 and a control phase winding 3. The power phase winding 2 of the motor 1 is connected in series with a capacitor 4 across a suitable source of alternating current, the conductors $L_1$ and $L_2$. The capacitor 4 is chosen with respect to the power phase winding 2 to form therewith a substantially series resonant circuit at the frequency of the voltage across the conductors $L_1$ and $L_2$. The control phase winding 3 of the motor 1 is connected in series with a source of pulsating unidirectional current 5 and a bi-stable transistor configuration 6 employing the transistors 7 and 8. The motor control phase winding 3 is shunted by a capacitor 9 which is selected with respect to the control phase winding 3 so as to form therewith a substantially parallel resonant circuit.

The pulsating unidirectional current source 5 comprises the diodes 11 and 12 connected across the secondary winding 13 of a transformer 14. The transformer 14 has a primary winding 15 which is connected across the conductors $L_1$ and $L_2$. The secondary winding 13 of the transformer 14 has a center tap 16 which is a negative terminal of the source 5.

As mentioned before, the bi-stable transistor configuration 6 employs the transistors 7 and 8. The transistor 7 is an npn junction transistor and the transistor 8 is a pnp junction transistor. Each of the transistors 7 and 8 have emitter, collector, and base electrodes. The transistors 7 and 8, being of opposite conductivity types, are connected so that positive feed-back will provide fast switching from a high-voltage low-current state to a high-current low-voltage state. Accordingly, the base 21 of the transistor 7 is directly connected to the collector 22 of the transistor 8. The emitter 23 of the transistor 7 is connected to an end terminal of a resistor 24 connected in series with the collector 22 of the transistor 8. The collector 25 of the transistor 7 is directly connected to the base 26 of the transistor 8. The emitter 29 of the transistor 8 is connected to ground and thus completes the series circuit including the unidirectional current source 5 and the motor control phase winding 3.

The numerals 31 and 32 designate a pair of terminals adapted to be connected to a source of reversible phase variable amplitude alternating current signal. As shown, the terminal 31 is connected to ground and thus the emitter 29 of the transistor 8. The terminal 31 is connected by means of a coupling capacitor 33 to the base 28 of the transistor 8. A source of direct current bias, shown here as the battery 34, is connected in series with a resistor 35 to the base electrode 28 of the transistor 8.

In considering the operation of the circuit of Fig. 1, it is necessary to understand the operation of the bi-stable configuration 6. A positive signal on the base of the pnp transistor 8 renders the transistor non-conductive and no current can flow through its emitter-collector circuit, and hence the motor control winding 3 which is in series therewith. A negative signal on the base 28 of the transistor 8, on the other hand, will permit current to flow in the emitter-collector circuit of that transistor, so as to raise the potential of the base 21 of the transistor 7, connected thereto, with respect to the emitter 23 of the transistor 7. Since the transistor 7 is an npn transistor, as the base 21 is made more positive with respect to the emitter 23, current flows into the collector 25 thereby lowering the potential of the base 28 of the transistor 8 which is connected thereto, with respect to the emitter 29. This causes still more current to flow from the collector 22 of the transistor 8 and thus, by virtue of this positive feedback, the bi-stable configuration 6 of the transistors 7 and 8 is quickly driven from a non-conductive high-voltage low-current state to a conductive high-current low-voltage state. The bi-stable configuration will remain in that state until the negative signal on the base 28 of the transistor 8 is removed and the pulsations of the source 5 reduce to zero. At this time, the bi-stable configuration switches quickly back to a non-conducting high-voltage low-current state. The positive bias applied to the base 28 of the transistor 8 by means of the battery 34 assures that the configuration will remain in this condition until it is overcome by a suitable negative control signal applied across the input terminals 31 and 32.

Referring now to Figure 2, there is shown a table of the voltage across and the current in various portions of the circuit of Figure 1 which illustrates the manner in which the switching action of the bi-stable configuration 6 is employed to control the operation of the motor 1. As shown, the voltage across the bi-stable configuration 6 and the motor control winding 3 is a pulsating unidirectional voltage. This voltage is obtained without phase shift from the voltage source represented by the conductors $L_1$ and $L_2$. In operation, the motor power phase winding 2 is energized continuously by current from the conductors $L_1$ and $L_2$. Due to the series resonant circuit formed by the capacitor 4 and the motor power phase winding 2, this current is in phase with the voltage across the conductors $L_1$ and $L_2$, which for the purpose of this explanation will be considered as a reference voltage.

As mentioned before, the terminals 31 and 32 are adapted to be connected to a reversible phase, variable amplitude, alternating current source. To control the operation of the motor 1, it is desirable that the phase of this alternating current signal be substantially either in phase or 180° out of phase with respect to the reference voltage. Accordingly, when the control signal applied across the terminals 31 and 32 is sufficiently negative to overcome the positive bias of the battery 34 and apply a negative signal on the base 28 of the transistor 8, the bi-stable configuration 6 will be switched into a conductive state, permitting current to flow through the motor control winding 3. The minimum control signal sufficient to overcome the positive bias of the source 34 will cause the bi-stable configuration 6 to switch from a non-conductive to a conductive state at the time the pulsations from the unidirectional current source 5 are at a maximum. Thus, such a minimum control signal will cause the bi-stable configuration 6 to be conductive for one quarter or for 90° of a reference voltage cycle. Larger control signals will cause the bi-stable configuration to be conductive from anywhere between 90° and 180° of the reference voltage cycle. Accordingly, proportional control is obtained since the variation of the control signal level varies the conduction angle of the bi-stable configuration 6 between 0° and 90° which varies the amplitude and phase of the signal on the control phase winding of the motor 1.

Due to the inductance of the control phase winding 3 and the capacitance of the capacitor 9, the current which flows in the motor control winding 3 leads or lags current in the motor power phase winding depending upon the phase of the control signal with respect to the reference voltage. Accordingly, the motor 1 is driven in one direction or the opposite direction, depending upon this phase relationship. It should be noted, that the phase relationship between the current in the motor control phase winding and the motor power phase winding is affected by the conduction angle of the bi-stable configuration 6. This effect can be seen in the curves illustrated in Fig. 2. The extent of this effect is approximately 30° for a conduction angle of 90° such as is obtained with a minimum control signal. As the conduction angle is increased toward 180° this phase shift decreases to zero, thus permitting an approximately 90° phase shift between motor control and power winding currents, and hence maximum motor torque, to be obtained for a conduction angle of 180° since this conduction angle also produces maximum amplitude of control winding current.

Since control is obtained over a total conduction angle of only 90°, the minimum controllable motor torque is not zero if the control signal is in phase or 180° out of phase with the reference voltage. It will be obvious to those skilled in the art, however, that variable phase shifting means may be employed to improve this condition. It should also be noted that since the bi-stable configuration 6 switches very rapidly between conductive and non-conductive states, the transistors 7 and 8 may be transistors having relatively low power handling capacities. Still further, it should be noted that the current flowing in the motor control winding 3 has a direct current component which provides a beneficial motor braking action.

Having now described this invention, that which is claimed as new and which it is desired to secure by Letters Patent is:

1. An apparatus for controlling a motor having a power phase winding and a control phase winding comprising, in combination, means adapted to connect said motor power phase winding to a source of alternating current of a fixed phase, a pair of terminals adapted to be connected to a source of an alternating control signal having a reversible phase with respect to said fixed phase current, a pair of transistors of opposite conductivity types connected in a bistable configuration having a conductive state and a non-conductive state, said bistable configuration having an input connected to said pair of terminals adapted to be connected to a source of an alternating control signal having a reversible phase with respect to said fixed phase current, biasing means connected to said terminals to render said bistable configuration non-conductive in the absence of a control signal, and a source of full wave rectified pulsating unidirectional current, said bistable configuration having an output connected in series with said motor control phase winding to said unidirectional current source.

2. Apparatus as specified in claim 1 wherein said bistable configuration comprises a pair of transistors of opposite conductivity types each having an emitter, a collector, and a base, and a resistor, the resistor being connected in series with the emitter-collector circuit of one of said transistors, the emitter-base circuit of the other of said transistors being connected across said resistor, with the collector of said other transistor being connected to the base of said first mentioned transistor.

3. In combination, a motor having a power phase winding and a control phase winding, said power phase winding being adapted to be connected to a source of alternating current having a fixed phase, a source of pulsating unidirectional current, a pair of complementary transistors connected in a bistable configuration, means connecting said bistable configuration in series with said motor control winding to said unidirectional current source, and control signal means for rendering said bistable configuration alternately conductive and non-conductive in relationship to the phase of said alternating current source.

4. Apparatus as specified in claim 3 wherein said bistable configuration has a direct current bias source connected thereto to maintain it in a non-conductive state in the absence of an input signal on said input signal means.

5. In combination, a motor having a power phase winding and a control phase winding, said power phase winding being adapted to be connected to a source of alternating current of a fixed phase, a pnp transistor, an npn transistor, a resistor, said transistors and said resistor being connected in a bistable configuration having a conductive and non-conductive state, a source of pulsating unidirectional current, the pulsations of said unidirectional current being in phase with said alternating current, means connecting said bistable configuration in series with said motor control winding to said unidirectional current source, and control signal means connected to said bistable configuration to render said configuration alternately conductive and non-conductive to permit current pulses from said unidirectional current source to flow through said motor control winding developing therein an alternating current having such a phase with respect to the alternating current flowing in said motor power phase winding as to drive said motor.

6. Apparatus as specified in claim 5 wherein said motor power phase winding is adapted to be connected to said source of alternating current through a capacitor having a capacity chosen with respect to said power phase winding as to form therewith a series resonant circuit.

7. Apparatus as specified in claim 5 wherein said control signal means includes a source of direct current bias to render said bistable configuration non-conductive in the absence of a control signal on the input of said control signal means.

8. In combination, a motor having a power phase winding and a control phase winding, said power phase winding being adapted to be connected to a source of alternating current having a fixed phase, a source of pulsating unidirectional current, a first transistor having input and output electrodes, a resistor, means connecting said output electrodes in series with said resistor and said motor control winding to said unidirectional current source, a second transistor of opposite conductivity type from said first transistor and having input and output electrodes, means connecting the input electrodes of said second transistor across said resistor, one of the output electrodes of said second transistor being connected to one of the input electrodes of said first transistor to supply positive feedback thereto, and control signal means connected to the input electrodes of said first transistor for rendering said first transistor alternately conductive and non-conductive in relationship to the phase of said alternating current source.

9. Apparatus as specified in claim 3 wherein said first transistor has a direct current bias source connected thereto to maintain it in a non-conductive state in the absence of an input signal on said input signal means.

No references cited.